United States Patent [19]

Dotrong et al.

[11] Patent Number: 5,610,261

[45] Date of Patent: Mar. 11, 1997

[54] ADAMANTANE BASED THREE-DIMENSIONAL RIGID-ROD POLYMERS

[75] Inventors: My Dotrong; Minhhoa Dotrong, both of Beavercreek; Robert C. Evers, Dayton, all of Ohio

[73] Assignee: The United States of America as represented by the Secretary of the Air Force, Washington, D.C.

[21] Appl. No.: 505,719

[22] Filed: Jun. 30, 1995

[51] Int. Cl.$^6$ .................................................. C08G 63/133
[52] U.S. Cl. ........................... 528/184; 528/176; 528/183
[58] Field of Search ..................................... 528/184, 183, 528/176

[56] References Cited

U.S. PATENT DOCUMENTS 4,207,407   6/1980   Helminiak et al. ..................... 525/425

OTHER PUBLICATIONS

M. Dotrong, M.H.Dotrong, G.J.Moore and R.C.Evers, *Three–Dimensional Benzobisoxazole Rigid–Rod Polymers,* Polymer Preprints, vol. 35, No. 2, Aug. 1994, pp. 673–674. Published Jul. 5, 1994.

G.R. Newkome, A. Nayak, R.K. Behera, C.N. Moorefield and G.R. Baker, *Cascade Polymers: Synthesis and Characterization of Four–Directional Spherical Dendritic Macromolecules Based on Adamantane*, J. Org. Chem, 1992, v 57, pp. 358–362.

*Primary Examiner*—Marion E. McCamish
*Assistant Examiner*—Helen F. Lee
*Attorney, Agent, or Firm*—Charles E. Bricker; Thomas L. Kundert

[57] ABSTRACT

High compressive strength, three-dimensional para-oriented benzobisoxazole polymers of the formula:

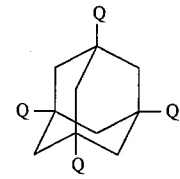

wherein Q is

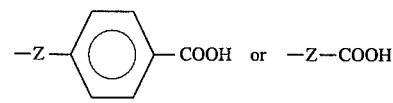

and wherein Z represents repeating units of the formula:

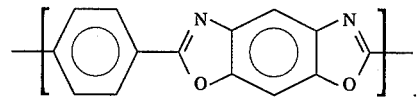

4 Claims, No Drawings

ADAMANTANE BASED THREE-DIMENSIONAL RIGID-ROD POLYMERS

RIGHTS OF THE GOVERNMENT

The invention described herein may be manufactured and used by or for the Government of the U.S. for all governmental purposes without the payment of any royalty.

BACKGROUND OF THE INVENTION

This invention relates to three-dimensional, rigid-rod polymers having benzobisazole polymer chains attached to an adamantane core.

The low compressive strengths of para-oriented benzobisoxazole polymer films and fibers have restricted their use in certain high-performance applications despite their excellent tensile properties, chemical resistance and thermooxidative stability.

We have prepared a three-dimensional para-oriented benzobisoxazole polymer having greater compressive strength than the one-dimensional polymers.

Accordingly, it is an object of the present invention to provide a three-dimensional para-oriented benzobisoxazole polymer.

It is another object of this invention to provide a method for preparing a three-dimensional para-oriented benzobisoxazole polymer.

Other objects and advantages of the present invention will be apparent to those skilled in the art.

SUMMARY OF THE INVENTION

In accordance with the present invention there are provided three-dimensional para-oriented benzobisoxazole polymers of the formula:

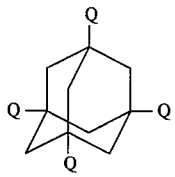

wherein Q is

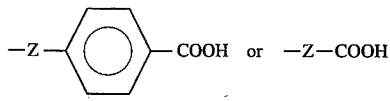

and wherein Z represents repeating units of the formula:

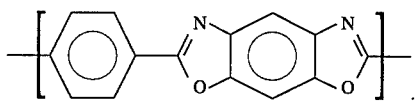

The adamantane-based three-dimensional rigid-rod polymers of this invention are prepared by the polycondensation of an AB-type monomer, such as 4-(5-amino-6-hydroxybenzoxazole-2-yl)benzoic acid (ABA) with a tetracarboxy-substituted adamantane, such as 1,3,5,7-tetrakis(4-carboxylatophenyl) adamantane (TCPA) or 1,3,5,7-adamantanetetracarboxylic acid (ATC), in polyphosphoric acid (PPA). The stoichiometry of the AB-type monomer to the tetracarboxy-substituted adamantane (molar ratio) used in the polycondensation reaction determines the length of the poly(benzo(1,2-d:4,5-d')bis-oxazole-2,6-diyl)-1,4-phenylene (PBO) chains. In general, the quantity of the tetracarboxy-substituted adamantane relative to the AB-type monomer can range from about 0.1 to 5.0 mol %.

Briefly, the polymerization process comprises the following steps: (i) solution of the AB-type monomer and the tetracarboxy-substituted adamantane monomer in 77% polyphosphoric acid (PPA) at a temperature of room temperature up to about 50°–65° C.; (ii) addition of $P_2O_5$ to raise the $P_2O_5$ content of the medium to 83%; (iii) chain propagation and cyclodehydration; and (iv) precipitation of the polymer into water, followed by washing the polymer with ammonium hydroxide and with hot water and drying the polymer in vacuum at 110° C.

Solution step (i) is generally carried out for about 1–24 hours. Chain propagation and cyclodehydration step (iii) is generally carried out a a temperature of about 120° to 190° C. for about 20–50 hours.

The polymers of this invention can be cast into film or fiber at the time of precipitation (step iv, above); alternatively, they can be precipitated, washed and dried as discussed previously, then dissolved in a strong acid, such as methanesulfonic acid (MSA), then spin-cast into fibers or cast into film.

The polymers of the present invention are also useful as reinforcing components in molecular composites. Such composites are disclosed, for example, in Helminiak et al, U.S. Pat. No. 4,207,407, issued Jun. 10, 1980. These composites comprise a flexible, coil-like aromatic heterocyclic matrix polymer and a para-oriented benzobisazole polymer. In these composites, the ratio, by weight, of matrix polymer to rigid-rod polymer can range from about 95:5 to about 1:1. Such composites may be employed as monolithic structures for a variety of applications, but particularly in high temperature environments.

The following examples illustrate the invention:

EXAMPLE I

Preparation of Model Compound

Stoichiometric quantities of 2-aminophenol and 1,3,5,7-tetrakis(4-carboxylatophenyl)adamantane (TCPA) were reacted in polyphosphoric acid at 190° C. A nearly quantitative yield of the desired model compound, 1,3,5,7-tetrakis(4-2-benzoxazolyl)phenyl)adamantane, was obtained. The structure of the model compound was verified by infrared and mass spectroscopy.

EXAMPLE II

Preparation of Three-Dimensional Polymer I

A slurry solution of 6.55 g of 77 percent polyphosphoric acid, 3.54 g of phosphorus pentoxide, 1.89 g (7 mmol) of 4-(5-amino-6-hydroxybenzoxazole-2-yl)benzoic acid (ABA) and 0.043 g (0.07 mmol) of 1,3,5,7-tetrakis(4-carboxylatophenyl)adamantane (TCPA) was stirred under a stream of dry nitrogen for two hours at room temperature. The temperature was then slowly increased to 100° C. over a period of two hours. After stirring for 20 hours at this temperature, stir opalescence was observed in the viscous colution. The reaction temperature was raised to 120° C. for 5 hours, 150° C. for one hour, and then to 165° C. for 24 hours. The reaction mixture exhibited an intense, but not persistent stir opalescence and became so extremely viscous that stirring had very little effect. The reaction temperature was finally raised to 190° C. After 10 hours, the reaction mixture was poured into water and the precipitated polymer was vigorously stirred in a blender with water. The resulting fibrous polymer was stirred in 5 percent $NH_4OH$ for 4 hours and in distilled water for 2 hours. After being extracted with water for 24 hours and methanol for 4 hours in a continuous extraction apparatus, the polymer was dried at 100° C. in vacuo for two days. 1.61 g of golden-yellow polymer was obtained (96% yield). The polymer had an intrinsic viscosity of 13.5 gl/g in methanesulfonic acid at 30° C. The IR spectrum of the the polymer exhibited absorptions at 1579, 1558, 1498, 1411, 1362, 1115, 1053, 1009, 853, 819 and 753 cm$^{-1}$. Elemental analysis: Calculated for $C_{1420}H_{622}N_{198}O_{198}$: C, 72.20; H, 2.65; N, 11.74. Found: C, 70.72; H, 2.68; N, 11.64.

The golden-yellow polymer was soluble only in methanesulfonic acid or polyphosphoric acid. The polymer structure was verified by elemental analysis and comparison of the polymer IR spectrum with the model compound spectrum. The spectra were consistent with the proposed structures and did not exhibit absorptions indicative of unreacted carboxylic acid, amine or hydroxy moieties. No evidence of carbonyl functional groups attributable to uncyclized amide or ester groups was observed.

EXAMPLE III

A series of polymerizations was conducted at polymer concentrations of 10 and 14%, and TCPA concentrations of 0, 1 and 2 mol %, as shown in the following table:

TABLE I

| Trial No. | ABA, mol % | TCPA, mol % | Polymer conc., % (w/w) | Stir opalescent | Intrinsic viscosity |
|---|---|---|---|---|---|
| I-1 | 100 | 0 | 10 | Yes | 13.3 |
| I-2 | 99 | 1 | 10 | Yes | 12.5 |
| I-3 | 100 | 0 | 14 | Yes | 16.8 |
| I-4 | 99 | 1 | 14 | Yes | 13.5 |
| I-5 | 98 | 2 | 14 | Yes | 9.6 |

Intrinsic viscosities (dl/g) were measured in methanesulfonic acid at 30° C.

Examination of the data in the Table reveals that incorporation of the 1,3,5,7-tetra substituted adamantane core component led to lower polymer intrinsic viscosities than achieved by homopolymerization reactions of ABA. Polymer concentrations of 10 and 14 percent (w/w) (Trials No. 2 and 4) at one percent TCPA molar content led to three-dimensional rigid-rod polymers with intrinsic viscosities of 12.5 and 13.5 dl/g, respectively, as compared to intrinsic viscosities of 13.3 and 16.8 dl/g for the analogous homopolymerization reaction (Trials No. 1 and 3). Under identical reaction conditions at 14 percent (w/w) polymer concentration, an even lower intrinsic viscosity (9.6 dl/g) was observed with a two percent TCPA molar content (Trial No. 5)

The thermooxidative stability of the three-dimensional rigid-rod polymers is very high, as shown by thermogravimetric analysis (TGA) in air and isothermogravimetric analysis (ITGA) at 260° C. in circulating air. The onset of weight loss under TGA did not occur until the temperature reached 500° C. Under ITGA, a weight loss of six percent was observed after 216 hours. Thermogravimetric/mass analysis (TG/MS) in vacuo indicated that the three-dimensional rigid-rod polymer is quite similar to one-dimensional PBO concerning the primary degradation products: CO, HCN, $H_2O$, $CO_2$, $NH_3$, $CH_4$, $C_6H_5CN$, and $C_6H_6$. A small amount of $CO_2$ was released at relatively low temperatures before the evolution of the bulk of the $CO_2$ product, perhaps an indication of degradation of carboxylic acid end groups. Differential scanning calorimetry gave no eviddence of a glass transition temperature.

The polymer obtained in Trial No. 5 was spun from PPA solution into fiber. The mechanical properties of this fiber are compared to one-dimensional PBO fiber in the following table:

TABLE II

| Polymer | Compressive Strength (Ksi) | Tensile Strength (Ksi) | Modulus (Msi) |
|---|---|---|---|
| 1-dimensional | 32 | 330 | 13 |
| 3-dimensional | 43 | 134 | 11.3 |

EXAMPLE IV

Preparation of Three-Dimensional Polymer II

A series of polymerizations was conducted at a polymer concentration of 14%, using the monomers 4-(5-amino-6-hydroxybenzoxazole-2-yl)benzoic acid (ABA) and 1,3,5,7-adamantanetetracarboxylic acid (ATC) in a manner similar to that described in Example II, above, as shown in the following table:

TABLE III

| Trial No. | ABA, mol % | ATC, mol % | Polymer conc., % (w/w) | Stir opalescent | Intrinsic viscosity |
|---|---|---|---|---|---|
| II-1 | 99 | 1 | 14 | Yes | 11.5 |
| II-2 | 98 | 2 | 14 | Yes | 6.9 |
| II-3 | 97 | 3 | 14 | Yes | 7.2 |
| II-4 | 95 | 5 | 14 | Yes | 6.7 |

Intrinsic viscosities (dl/g) were measured in methanesulfonic acid at 30° C.

Elemental analysis for polymer II-2: Calculated for $C_{1392}H_{612}N_{196}O_{196}$: C, 72.01; H, 2.66; N, 11.85. Found: C, 70.05; H, 2.63; N, 11.69.

Various modifications may be made in the instant invention without departing from the spirit and scope of the appended claims.

We claim:

1. A three-dimensional para-oriented benzobisazole polymer of the formula:

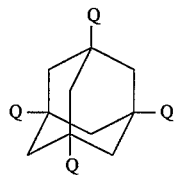

wherein Q is

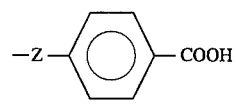

wherein Z represents repeating units of the formula:

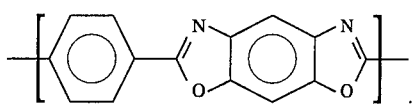

2. The polymer of claim 1 wherein the quantity of the adamantane core unit is about 0.1 to 5.0 mol % of said polymer.
3. A three-dimensional para-oriented benzobisazole polymer of the formula:
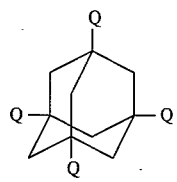
wherein Q is
—Z—COOH
wherein Z represents repeating units of the formula:
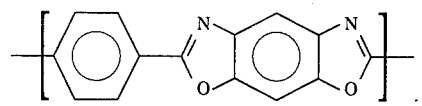
4. The polymer of claim 3 wherein the quantity of the adamantane core unit is about 0.1 to 5.0 mol % of said polymer.
* * * * *